(12) United States Patent
Vanjani

(10) Patent No.: US 6,321,863 B1
(45) Date of Patent: Nov. 27, 2001

(54) HUB MOTOR FOR A WHEELED VEHICLE

(75) Inventor: Chandu R. Vanjani, Granada Hills, CA (US)

(73) Assignee: Mac Brushless Motor Company, St. Louis, MO (US)

( * ) Notice: Subject to any disclaimer, the term of this patent is extended or adjusted under 35 U.S.C. 154(b) by 0 days.

(21) Appl. No.: 09/603,773

(22) Filed: Jun. 26, 2000

(51) Int. Cl.[7] .................................................. B60K 1/00
(52) U.S. Cl. ......................................... 180/65.5; 180/206
(58) Field of Search .................................. 180/65.5, 205, 180/206, 207, 220, 230, 65.1, 65.2

(56) References Cited

U.S. PATENT DOCUMENTS

| | | | | |
|---|---|---|---|---|
| 2,588,889 | * | 3/1952 | Sherwood | 180/220 |
| 5,341,892 | * | 8/1994 | Hirose et al. | 180/220 |
| 5,782,716 | * | 7/1998 | Hukui et al. | 180/65.5 X |
| 5,857,537 | * | 1/1999 | Matsumoto et al. | 180/206 |
| 5,984,038 | * | 11/1999 | Fujiwara et al. | 180/206 |
| 6,059,060 | * | 5/2000 | Kanno et al. | 180/65.5 X |
| 6,104,112 | * | 8/2000 | Vanjami . | |
| 6,155,367 | * | 12/2000 | Alber | 180/65.5 X |

FOREIGN PATENT DOCUMENTS

6321170  *  11/1994  (JP) .

* cited by examiner

Primary Examiner—Anne Marie Boehler
Assistant Examiner—Bryan Fischmann
(74) Attorney, Agent, or Firm—Jack C. Munro

(57) ABSTRACT

A compact, self contained hub motor to be mounted on a wheeled vehicle wheel in order for a wheeled vehicle to be driven electrically. The wheel has a hub within which is mounted a stationary center shaft. Mounted about the center shaft is a motor housing which is rotationally mounted on the center shaft. The motor housing has an internal chamber. Within the internal chamber is mounted a motor. Operation of the motor causes rotation of the motor housing which simultaneously drives the wheeled vehicle wheel on which the motor is mounted.

6 Claims, 2 Drawing Sheets

HUB MOTOR FOR A WHEELED VEHICLE

BACKGROUND OF THE INVENTION

1) Field of the Invention

The field of this invention relates to electric motors that are designed to be used in conjunction with a bicycle wheel of a bicycle, tricycle or any other similar wheeled vehicle, and more particularly to a compact, small in size, powerful electric motor which has an internal controller which is mounted at the hub of the wheel which is being driven.

2) Description of the Prior Art

Although the hub motor of the present invention has been found to have particular utility in conjunction with electrically operated bicycles, the motor is also deemed to have utility of other applications such as operating of a scooter, moped, tricycle, wheelchair and other types of manually operated wheeled vehicles as well as within other environments that are unknown to the inventor at this particular time. This invention will be discussed primarily in conjunction with bicycles for description purposes only.

Electric motors have been used in the past to operate bicycles electrically. The electric motors of the prior art have been rather large in size and are of relatively heavy weight. It is desirable to have the electric motor to be as small as possible and also to have the motor be as light in weight as possible to thereby keep the overall weight of the bicycle as low as possible. Also, electric bicycles of the prior art have exposed internal components. Bicycles are frequently ridden through adverse weather conditions which can result in water and foreign material, such as mud, contaminating the internal components of the electric motor.

Electric motors require the use of an electronic controller which controls the different speeds that the motor is being operated. In the past, it has been common to use a controller that is mounted separate from the motor. This requires an additional structure and requires separate mounting in conjunction with a bicycle being preferable to eliminate the use of this separate structure.

SUMMARY OF THE INVENTION

The hub motor of the present invention is designed to comprise a small in size, compact motor assembly which is to be mounted in conjunction with the hub of a bicycle wheel. The motor assembly comprises a self contained unit which includes a rotationally driven motor housing that is connected directly to the tire supporting rim of the bicycle wheel. Rotation of the motor housing will result in similar rotation of the tire supporting rim of the bicycle wheel. The motor housing has an internal chamber and within that internal chamber is located a stator and a rotor. The stator is fixedly mounted onto a center shaft which passes through the motor housing which is fixedly mounted to the bicycle frame. The rotor is to be rotated by the electrical energy being supplied to the stator with this rotation being transferred through a drive shaft to a driven gear. This driven gear is mounted within the internal chamber of the motor housing. A one-way clutch is to be mounted between the driven gear and the motor housing so that the normal driving torque of the driven gear will cause rotation of the motor housing but any torque in the opposite direction will not be transferred to the motor housing.

One of the primary objectives of the present invention is to construct a motor assembly which is mounted within a motor housing which is mounted at the hub of a bicycle wheel.

Another objective of the present invention is to construct a motor assembly for a bicycle wherein the hub motor, controller for the motor and clutch are all mounted within a rotational motor housing to which is to be fixed the tire supporting rim of the wheel of the bicycle.

Another objective of the present invention is to construct a motor assembly which can be manufactured at a reasonable cost and thereby sold to the ultimate consumer at a reasonable cost.

BRIEF DESCRIPTION OF THE DRAWINGS

For a better understanding of the present invention, reference is to be made to the accompanying drawings. There could be utilized alternate embodiments of the present invention which are not shown in the accompanying drawings but are believed to still fall within the scope of this invention. It is to be understood the invention is not limited to the precise arrangement shown in the drawings.

DETAILED DESCRIPTION OF THE PREFERRED EMBODIMENT

Figure 1:
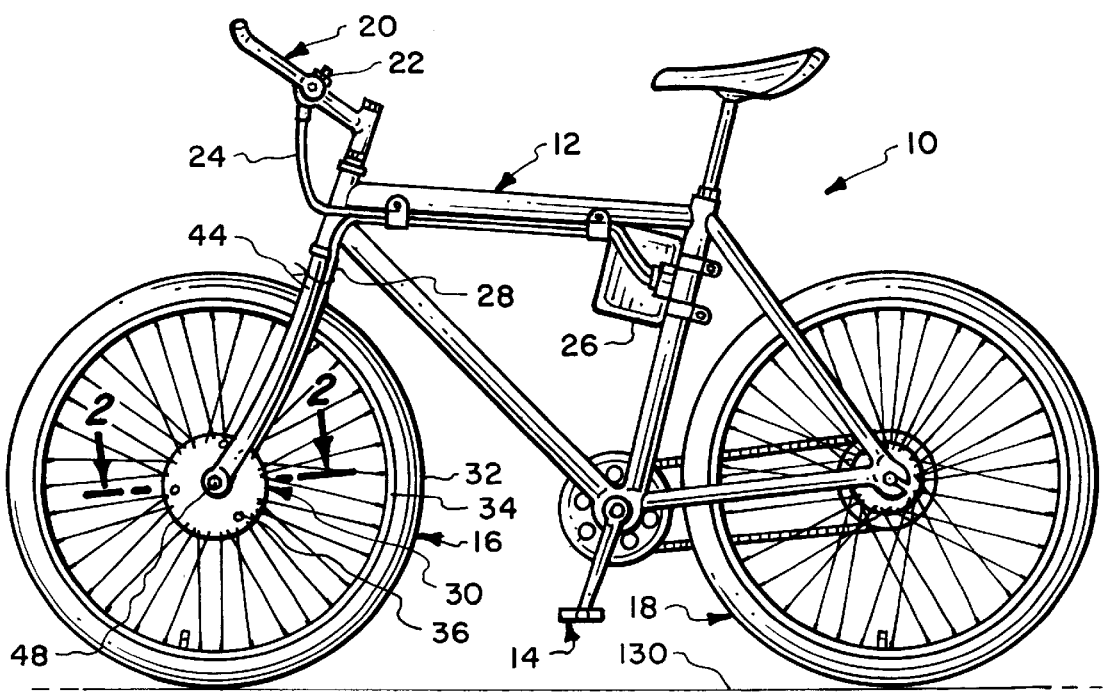
FIG. 1 is an external side elevational view of a bicycle within which is incorporated the hub motor assembly of the present invention.
Figure 3:
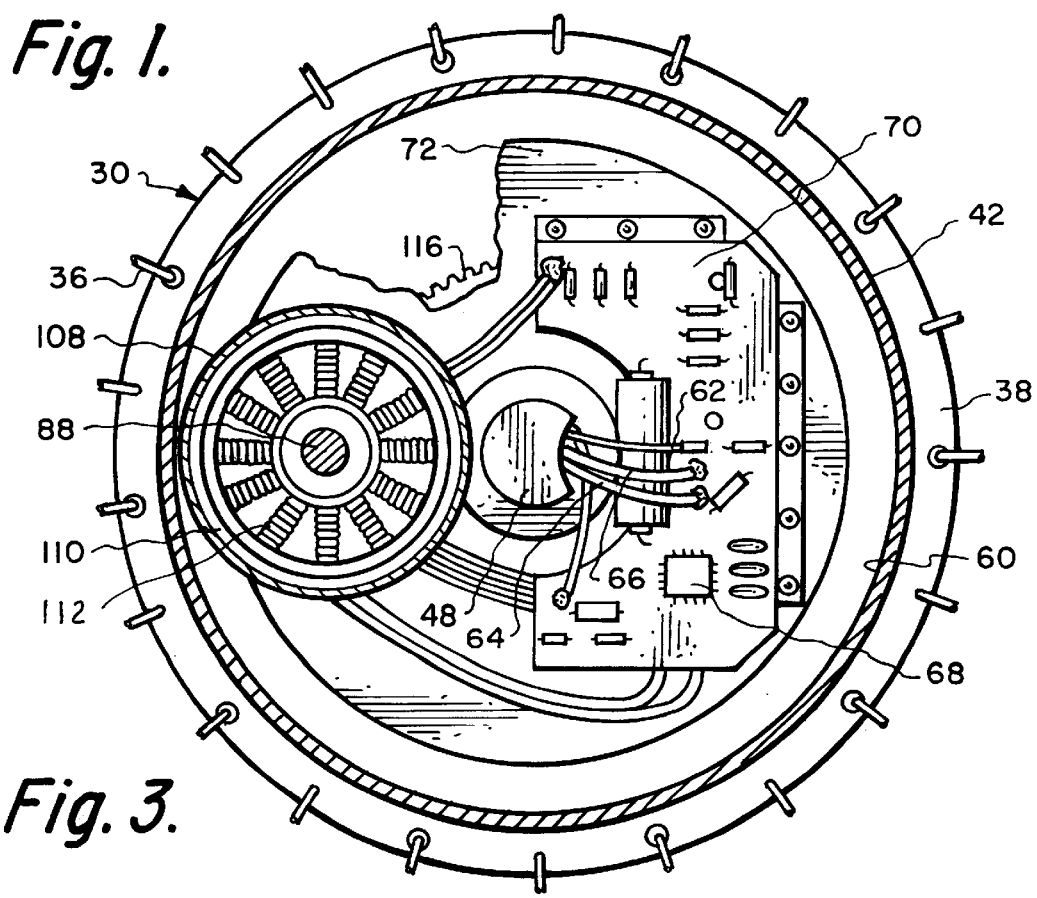
FIG. 3 is a cross-sectional view through the hub motor assembly of this invention taken along line 3—3 of FIG. 2.
Figure 2:
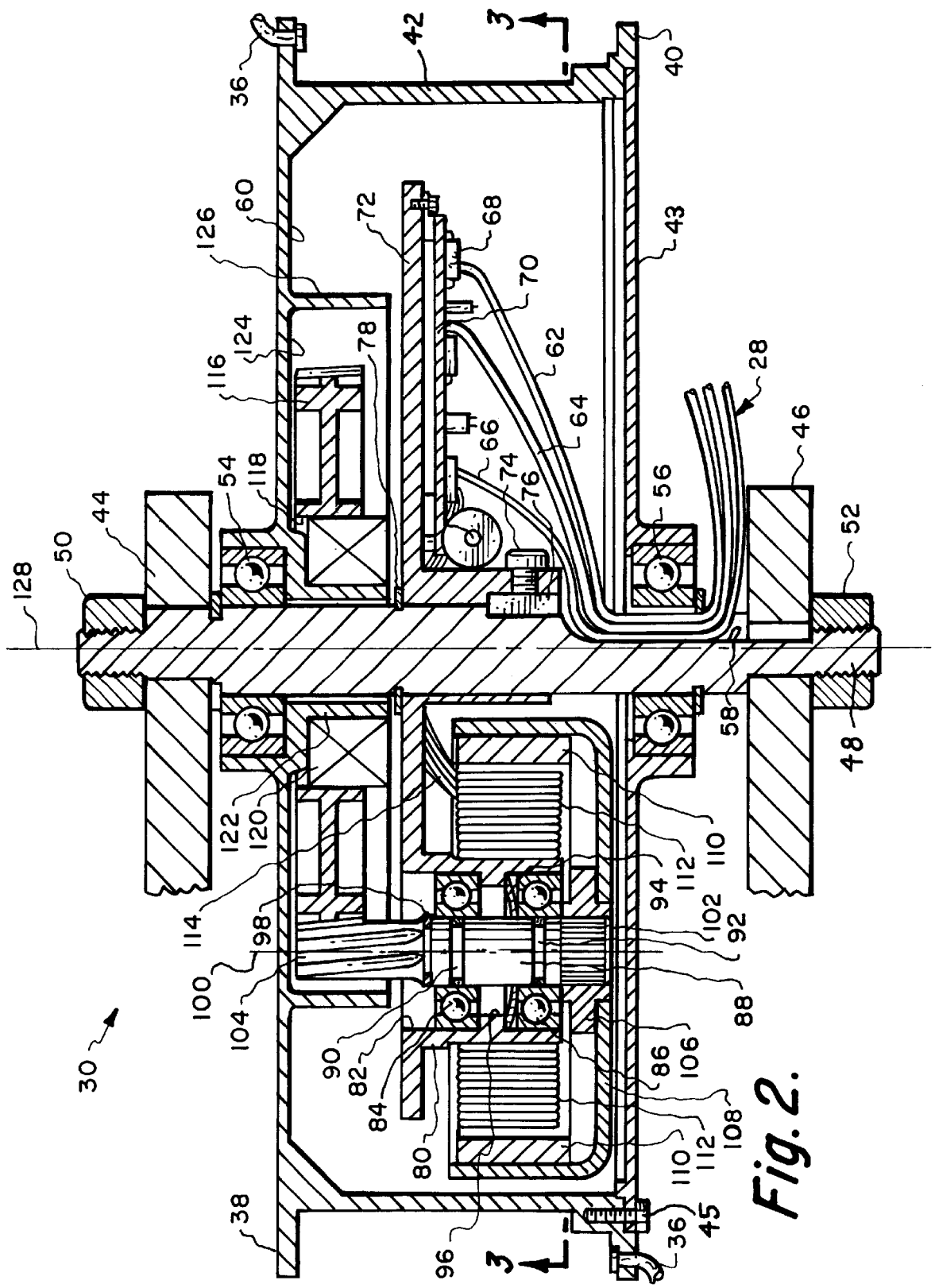
FIG. 2 is a cross-sectional view taken through the hub motor assembly of this invention taken along line 2—2 of FIG. 1.

Referring particularly to the drawings, there is shown in FIG. 1 a conventional bicycle 10 which has a tubular frame 12 upon which is mounted a foot operational pedal assembly 14, a front wheel 16 and a rear wheel 18. The frame 12 includes a handlebar assembly 20 on which is mounted an electrical switch 22. The electrical switch 22 is connected by a conductor 24 to a battery 26. The battery 26 is connected by a cable 28 to the hub motor assembly 30 of this invention. The hub motor assembly 30 is shown mounted in conjunction with the front wheel 16. However, it is considered to be within the scope of this invention that the hub motor assembly 30 could be mounted in conjunction with the rear wheel 18.

The front wheel 16 includes a rubber tire 32 which is mounted on a tire supporting rim 34. The tire supporting rim 34 is connected to a series of wire spokes 36. The inner end of the wire spokes are attached to annular flange 38 and annular flange 40 of a motor housing 42. Fixedly mounted between the fork members 44 and 46 of the bicycle frame 12 is a center shaft 48. The ends of the center shaft 48 are threaded with a nut 50 being used to fixedly mount the center shaft 48 to the fork member 44 and the nut 52 being used to fixedly secure the center shaft 48 to the fork member 46. Mounted on the center shaft 48 are a pair of spaced apart bearing assemblies 54 and 56. The motor housing 42 is rotationally mounted on bearing assembly 54. The motor housing 42 includes a removable access plate 43 which is bolted to housing 42 by bolt fasteners 45. The center shaft 48 has a longitudinal center axis 128.

The center shaft 48 includes a cutout 58. The cable 28 is to be passed through the cutout 58 to be located within the internal chamber 60 of the motor housing 42. The cable 28 comprises a plurality of electrical conducting wires like 62, 64 and 66 which are connected to electronic components such as component 68, mounted on a printed circuit board 70. Note that all the wires are not shown and the number of the wires will vary based on control functions required. Printed circuit board 70 is then fixedly mounted on a mounting plate 72. The mounting plate 72 is made of heat conductive material like aluminum and is basically disc shaped and is fixedly attached by means of a set screw 74 and a key 76 to the center shaft 48. One side of the mounting plate 72 abuts against a retaining ring 78 which is fixedly mounted to the center shaft 48.

Integrally formed to the mounting plate 72 is a sleeve 80. The sleeve 80 has a through opening 82. Fitted within the sleeve 80 are a pair of bearing assemblies 84 and 86. Fitted into the bearing assemblies 84 and 86 is a drive shaft 88. Drive shaft 88 includes a pair of spaced apart annular grooves 90 and 92. Glue is to be applied within the grooves 90 and 92 with groove 90 to connect with the inner race of bearing assembly 84 and groove 92 connecting with the inner race of bearing assembly 86. It is the function of the glue to provide a means of further securement of the inner races of the bearing assemblies 90 and 92 so as to affix such to the drive shaft 88. In order to minimize the creation of noise and provide for smooth rotation of the drive shaft 88 there is mounted a circular leaf spring 94 between annular ridge 96 of the sleeve 80 and the outer race of bearing assembly 86. This will exert a constant axial torque applying an actual force against retaining ring 98 which is mounted on the drive shaft 88. The inner race of the bearing assembly 84 abuts against the retaining ring 98.

The drive shaft 88 is capable of being rotated about rotational axis 100. It is to be noted that the rotational axis 100 is located parallel to the longitudinal center axis 128. The locating of the axes 100 and 128 parallel provides for smoother operation of the motor. The aft end of the drive shaft 88 includes a spline connection 102 with the forward end of the drive shaft 88 including a spline connection 104. The spline connection 102 connects with rotor bushing 106. Rotor bushing 106 is securely mounted onto a cup shaped member which is defined as rotor 108. Mounted interiorly of the rotor 108 are a series of magnets 110. These magnets 110 are to be located directly adjacent but slightly spaced from a series of radially located coils 112. There are multiple numbers of the coils 112 each of which comprises electrically conductive wires that are wound about a series of radially disposed spokes called stator laminations, which are not shown. The coils 112 are connected by leads 114 to the printed circuit board 70.

Spline connection 104 connects with the circular shaped driven gear 116. The driven gear 116 has a center opening 118. Press fitted within the center opening 118 is a clutch assembly 120. The clutch assembly 120 is mounted on sleeve 122 which is an integral part of the motor housing 42. Clutch assembly 120 is what is termed as a one-way clutch. Driven gear 116 is mounted within a chamber 124 which is defined by a circular shaped stub wall 126. The stub wall 126 is integrally connected to the motor housing 42 and is located within the internal chamber 60.

The operation of the hub motor assembly 30 of this invention is as follows: When the bicycle rider wishes to drive the bicycle 10 by means of electrical power, the user is to manually move switch 22 from the off position to the on position. This will result in electrical power from the battery 26 being supplied through the cable 28 to the printed circuit board 70 and then through lead wires 114 to the coils 112. This will cause the rotor 108 to be rotated due to the forming of a magnetic field between the coils 112 and the magnets 110. This rotation of the rotor 108 will cause the rotor bushing 106 to rotate which rotates the drive shaft 88. The rotation of the drive shaft 88 will cause the driven gear 116 to be rotated. In comparing the size between the spline connection 102 and the driven gear 116, it can be seen that there will be a substantial number of revolutions of the drive shaft 88 for each revolution of the driven gear 116. This gear reduction is required so that the motor housing 42 will be rotated at a substantial number of less revolutions per minute than the drive shaft 88. Let it be assumed that the driven gear 116 is rotated clockwise in order to achieve the desirable similar rotation of the motor housing 42 which in turn will produce, in essence, the same rotation of the front tire 16 propelling the bicycle 10 on the supporting surface 130. It is to be noted that the driven gear 116 is mounted by 132 and 120 one-way clutch assembly 132, the construction of which is deemed to be conventional, relative to the sleeve 122. When the switch 22 is moved to the off position and power is not being transmitted to the coils 112, the rotor 108 begins to slow down in rotation and will actually come to a stop in a short period of time. The front wheel 16 of the bicycle 10 will continue to rotate which is permitted by means of the one-way clutch 120.

In an alternate embodiment of this invention, which is not shown in the drawings, the one-way clutch 120 could be mounted between the drive shaft 88 and the sleeve 80. In some installations, this mounting would be preferred as it further compacts the overall structure of the present invention so that the hub motor assembly 30 can actually be smaller in size.

What is claimed is:

1. A hub motor to be centrally mounted within a wheel of a wheeled vehicle to make the wheeled vehicle operate by electric power comprising:

a center shaft adapted to be mounted onto a wheeled vehicle frame;

a motor housing rotationally mounted on said center shaft, said motor housing having an internal chamber, said motor housing is adapted to be mounted onto a wheeled vehicle wheel and designed to rotate in unison therewith;

a mounting plate fixedly mounted on said center shaft, said mounting plate being located within said internal chamber;

a stator mounted on said mounting plate;

a drive shaft rotationally mounted on said mounting plate;

a rotor rotationally mounted relative to said stator, said rotor being located within said internal chamber, said rotor being connected to said drive shaft and is to cause rotation of said drive shaft upon rotation of said rotor, said drive shaft being connected to said motor housing, whereby supplying of electrical energy to said stator causes rotation of said rotor and rotation of said motor housing which will rotate a wheeled vehicle wheel on which it is mounted; and said drive shaft being axially biased in order to diminish noise and insure smooth operation of the rotation of said drive shaft.

2. A hub motor to be centrally mounted within a wheel of a wheeled vehicle to make the wheeled vehicle operate by electric power comprising:

a center shaft adapted to be mounted onto a wheeled vehicle frame;

a motor housing rotationally mounted on said center shaft, said motor housing having an internal chamber, said motor housing is adapted to be mounted onto a wheeled vehicle wheel and designed to rotate in unison therewith;

a mounting plate fixedly mounted on said center shaft, said mounting plate being located within said internal chamber;

a stator mounted on said mounting plate;

a drive shaft rotationally mounted on said mounting plate;

a rotor rotationally mounted relative to said stator, said rotor being located within said internal chamber, said rotor being connected to said drive shaft and is to cause rotation of said drive shaft upon rotation of said rotor, said drive shaft being connected to said motor housing, whereby supplying of electrical energy to said stator causes rotation of said rotor and rotation of said motor housing which will rotate a wheeled vehicle wheel on which it is mounted; and a driven gear is mounted within said internal chamber, said driven gear connecting with said drive shaft, said driven gear being connected with said motor housing.

3. The hub motor as defined in claim 2 wherein:

a clutch is mounted between said driven gear and said motor housing, said clutch to produce a driving connection between said motor housing and said driven gear in one direction of rotation and in the opposite direction of rotation permitting free wheeling of said motor housing.

4. In combination with a wheeled vehicle having a wheel, said wheel having a hub, a center shaft included within said wheel, a wheeled vehicle frame supporting said wheel, said center shaft being fixed to said wheeled vehicle frame, a hub motor mounted on said center shaft, the improvement comprising:

a motor housing rotationally mounted on said center shaft, said motor housing having an internal chamber, said wheeled vehicle wheel having a tire supporting rim, said tire supporting rim being fixedly mounted to said motor housing and designed to rotate in unison therewith;

a mounting plate fixedly mounted on said center shaft, said mounting plate being located within said internal chamber;

a stator mounted on said mounting plate;

a drive shaft rotationally mounted on said mounting plate;

a rotor rotationally mounted relative to said stator, said rotor being located within said internal chamber, said rotor being connected to said drive shaft and is to cause rotation of said drive shaft upon rotation of said rotor, said drive shaft being connected to said motor housing, whereby supplying of electrical energy to said stator causes rotation of said rotor and rotation of said motor housing which will rotate said wheeled vehicle wheel; and said drive shaft being axially biased in order to diminish noise and insure smooth operation of the rotation of said drive shaft.

5. In combination with a wheeled vehicle having a wheel, said wheel having a hub, a center shaft included within said wheel, a wheeled vehicle frame supporting said wheel, said center shaft being fixed to said wheeled vehicle frame, a hub motor mounted on said center shaft, the improvement comprising:

a motor housing rotationally mounted on said center shaft, said motor housing having an internal chamber, said wheeled vehicle wheel having a tire supporting rim, said tire supporting rim being fixedly mounted to said motor housing and designed to rotate in unison therewith;

a mounting plate fixedly mounted on said center shaft, said mounting plate being located within said internal chamber;

a stator mounted on said mounting plate;

a drive shaft rotationally mounted on said mounting plate;

a rotor rotationally mounted relative to said stator, said rotor being located within said internal chamber, said rotor being connected to said drive shaft and is to cause rotation of said drive shaft upon rotation of said rotor, said drive shaft being connected to said motor housing, whereby supplying of electrical energy to said stator causes rotation of said rotor and rotation of said motor housing which will rotate said wheeled vehicle wheel; and a driven gear is mounted within said internal chamber, said driven gear connecting with said drive shaft, said driven gear being connected with said motor housing.

6. The combination as defined in claim 5 wherein:

a clutch is mounted between said driven gear and said motor housing, said clutch to produce a driving connection between said motor housing and said driven gear in one direction of rotation and in the opposite direction of rotation permitting free wheeling of said motor housing.

\* \* \* \* \*